(12) United States Patent
Upadhya et al.

(10) Patent No.: US 11,700,023 B2
(45) Date of Patent: Jul. 11, 2023

(54) RADIO FREQUENCY TRANSMISSION CHAINS

(71) Applicant: NOKIA TECHNOLOGIES OY, Espoo (FI)

(72) Inventors: Karthik Upadhya, Espoo (FI); Carl Nuzman, Union, NJ (US); Alexei Ashikhmin, Morristown, NJ (US); Stefan Wesemann, Kornwestheim (DE); Hong Yang, Ledgewood, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/471,438

(22) Filed: Sep. 10, 2021

(65) Prior Publication Data
US 2022/0085833 A1 Mar. 17, 2022

(30) Foreign Application Priority Data
Sep. 14, 2020 (FI) ...................................... 20205883

(51) Int. Cl.
*H04W 88/06* (2009.01)
*H04B 1/00* (2006.01)
*H04B 1/04* (2006.01)

(52) U.S. Cl.
CPC ......... *H04B 1/0064* (2013.01); *H04B 1/0475* (2013.01); *H04W 88/06* (2013.01)

(58) Field of Classification Search
CPC ... H04L 5/0048; H04L 5/0053; H04L 5/0051; H04L 5/0023; H04L 5/005; H04L 5/00;
(Continued)

(56) References Cited

U.S. PATENT DOCUMENTS 9,774,476 B2    9/2017 Nammi et al.
9,900,064 B2 *  2/2018 Verbin ................ H04B 7/0417
(Continued)

FOREIGN PATENT DOCUMENTS

EP          3324552       5/2018
WO     WO 2018/054446 A1  3/2018
(Continued)

OTHER PUBLICATIONS

Jacobsson et al., "On out-of-band emissions of quantized precoding in massive MU-MIMO-OFDM," 2017 51st Asilomar Conference on Signals, Systems, and Computers, Pacific Grove, CA, 2017, pp. 21-26.
(Continued)

*Primary Examiner* — Eva Y Puente
(74) *Attorney, Agent, or Firm* — Alston & Bird LLP

(57) ABSTRACT

An apparatus comprises: a first plurality of first radio frequency chains; a second plurality of second radio frequency chains, the first radio frequency chains being configured to produce wider side-band emissions than the second radio frequency chains; at least one antenna array comprising antenna elements, each of a first plurality of the antenna elements being coupled with a corresponding one of the first plurality of first radio frequency chains, the first plurality of first radio frequency chains being configured to cause transmissions predominately in a first band within a channel, each of a second plurality of the antenna elements being coupled with a corresponding one of the second plurality of second radio frequency chains, the second plurality of second radio frequency chains being configured to cause transmissions predominately in at least one second band within the channel.

20 Claims, 7 Drawing Sheets

(58) Field of Classification Search
CPC ... H04L 5/0007; H04L 5/0057; H04L 1/0026;
H04W 72/042; H04W 16/28; H04W
72/0413; H04W 72/046; H04W 24/10;
H04W 72/0446; H04W 72/04; H04W
72/085; H04W 72/0453; H04W 88/08;
H04W 88/06; H04W 52/52; H04W
52/243; H04W 52/0251; H04W 52/02;
H04W 52/0274; H04W 52/146; H04B
2001/0425; H04B 1/0475; H04B 1/04;
H04B 1/62; H04B 2001/0433; H04B
2001/0408; H04B 17/391; H04B 10/58
USPC ......................................................... 375/296
See application file for complete search history.

(56) References Cited

U.S. PATENT DOCUMENTS

| | | | |
|---|---|---|---|
| 10,461,786 | B2 | 10/2019 | Nammi |
| 10,530,399 | B2 | 1/2020 | Johansson et al. |
| 10,673,475 | B1 | 6/2020 | Zhou et al. |
| 2007/0060190 | A1 | 3/2007 | Sanders et al. |
| 2015/0326285 | A1 | 11/2015 | Zirwas et al. |
| 2017/0054473 | A1 | 2/2017 | Jochen et al. |
| 2017/0359111 | A1 | 12/2017 | Shaked |
| 2018/0026586 | A1 | 1/2018 | Carbone et al. |
| 2018/0219713 | A1 | 8/2018 | Jia et al. |
| 2019/0349224 | A1* | 11/2019 | Chiskis .................. H04B 3/32 |
| 2020/0014412 | A1 | 1/2020 | Hattori et al. |
| 2021/0067215 | A1* | 3/2021 | Song .................. H04B 7/0632 |
| 2021/0091832 | A1* | 3/2021 | Obiya ................. H04B 1/0057 |

FOREIGN PATENT DOCUMENTS

| | | |
|---|---|---|
| WO | WO 2019/097116 A1 | 5/2019 |
| WO | WO 2019/110327 A1 | 6/2019 |

OTHER PUBLICATIONS

Lee et al., "Hybrid RF-Baseband Precoding for Cooperative Multiuser Massive MIMO Systems with Limited RF Chains", IEEE Transactions on Communications, vol. 65, No. 4, (Apr. 2017), 15 pages.

Liu et al., "Two-Stage Constant-Envelope Precoding for Low-Cost Massive MIMO Systems", IEEE Transactions on Signal Processing, vol. 64, No. 2, (Jan. 15, 2016), 10 pages.

Mollén et al., "Multiuser MIMO precoding with per-antenna continuous-time constant-envelope constraints," 2015 IEEE 16th International Workshop on Signal Processing Advances in Wireless Communications (SPAWC), Stockholm, 2015, pp. 261-265.

Office Action for Finland Application No. 20205883 dated Feb. 16, 2021, 8 pages.

Staudacher et al., "Optimized Combination of Conventional and Constrained Massive MIMO Arrays," WSA 2017; 21th International ITG Workshop on Smart Antennas, Berlin, Germany, 2017, pp. 1-4.

Wang et al., "Hybrid Precoder and Combiner Design with Low-Resolution Phase Shifters in mmWave MIMO Systems", IEEE Journal of Selected Topics in Signal Processing, vol. 12, No. 2, (May 2018), 14 pages.

Extended European Search Report for European Application No. 21195016.7 dated Feb. 9, 2022, 7 pages.

* cited by examiner

RADIO FREQUENCY TRANSMISSION CHAINS

CROSS-REFERENCE TO RELATED APPLICATIONS

This application claims priority to Finnish Application No. 20205883, filed Sep. 14, 2020, the entire contents of which are incorporated herein by reference.

TECHNOLOGICAL FIELD

Various example embodiments relate to an apparatus having radio frequency transmission chains.

BACKGROUND

Radio frequency transmission chains are known. Such chains are incorporated into wireless telecommunications apparatus and convert and/or condition base band signals into signals to be provided to an antenna element for transmission.

Although such radio frequency transmission chains exist, they have some shortcomings. Accordingly, it is desired to provide improved radio frequency transmission chains.

BRIEF SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various, but not necessarily all, embodiments of the invention there is provided an apparatus, comprising: a first plurality of first radio frequency chains; a second plurality of second radio frequency chains, the first radio frequency chains being configured to produce wider side-band emissions than the second radio frequency chains; at least one antenna array comprising antenna elements, each of a first plurality of the antenna elements being coupled with a corresponding one of the first plurality of first radio frequency chains, the first plurality of first radio frequency chains being configured to cause transmissions predominately in a first band within a channel, each of a second plurality of the antenna elements being coupled with a corresponding one of the second plurality of second radio frequency chains, the second plurality of second radio frequency chains being configured to cause transmissions predominately in at least one second band within the channel.

The first band may comprise at least a central band within said channel and said second band may comprise a side band within said channel.

The first plurality of first radio frequency chains may comprise a first digital predistortion module and the second plurality of second radio frequency chains may comprise a second digital predistortion module, the second digital predistortion module may be configured to perform higher complexity digital predistortion than the first digital predistortion module.

The second radio frequency chains may be configured to produce narrower side-band emissions than the first radio frequency chains.

The first radio frequency chains may be configured to produce transmissions with greater power within the central band than within the at least one side band.

The second radio frequency chains may be configured to produce transmissions with greater power within the at least one side band than within the central band.

The first radio frequency chains may be less linear than the second radio frequency chains.

The second radio frequency chains may be more linear than the first radio frequency chains.

The central band may comprise at least a first group of central sub-carriers within the channel.

The side band may comprise a second group of sub-carriers adjacent the first group within the channel.

The second plurality of second radio frequency chains may be configured to cause transmissions predominantly within a pair of side bands within the channel.

The second group of sub-carriers may surround the first group of central sub-carriers within the channel.

The first group of sub-carriers may comprise different sub-carriers from the second group of sub-carriers.

Each of the first plurality of first radio frequency chains may comprise a non-linear precoder.

Each of the first plurality of first radio frequency chains may share the non-linear precoder.

The non-linear precoder may be configured to cause transmissions outside the channel with a power which is less than a second threshold amount.

The non-linear precoder may be configured to cause transmissions within the side bands with a power which is less than a first threshold amount.

The first threshold amount may be greater than the second threshold amount.

The non-linear precoder may be configured to beamform transmissions within the central band towards an intended recipient.

The non-linear precoder may be configured to beamform transmissions radiated from the first plurality of radio frequency chains within the side bands away from an intended recipient.

The non-linear precoder may be configured to reduce power of transmissions within the side bands compared to transmissions within the central band.

Each of the second plurality of second radio frequency chains may comprise a linear precoder.

Each of the second plurality of second radio frequency chains may share the linear precoder.

The linear precoder may be configured to cause transmissions within the central band with a power which is less than a third threshold amount.

The linear precoder may be configured to cause transmissions outside the channel with a power which is less than the second threshold amount.

The linear precoder may be configured to beamform transmissions within the side bands towards an intended recipient.

The linear precoder may be configured to beamform transmissions within the central band away from an intended recipient.

The linear precoder may be configured to reduce power of transmissions within the central band compared to transmissions within the side bands.

The intended recipient may comprise a user equipment.

The apparatus may comprise a pair of antenna arrays, a first of the pair comprising the first plurality of the antenna elements and a second of the pair comprising the second plurality of the antenna elements.

The apparatus may comprise a base station.

According to various, but not necessarily all, embodiments of the invention there is provided a method, comprising: providing a first plurality of first radio frequency chains, a second plurality of second radio frequency chains and at least one antenna array comprising antenna elements; coupling each of a first plurality of the antenna elements with a corresponding one of the first plurality of first radio frequency chains and each of a second plurality of the antenna elements with a corresponding one of the second plurality of second radio frequency chains; and configuring the first radio frequency chains to produce wider side-band emissions than the second radio frequency chains, the first plurality of first radio frequency chains to cause transmissions predominately in a first band within a channel and the second plurality of second radio frequency chains to cause transmissions predominately in at least one second band within the channel.

The first band may comprise at least a central band within said channel and said second band may comprise a side band within said channel.

The first plurality of first radio frequency chains may comprise a first digital predistortion module and the second plurality of second radio frequency chains may comprise a second digital predistortion module, the configuring may comprise configuring the second digital predistortion module to perform higher complexity digital predistortion than the first digital predistortion module.

The configuring may comprise configuring the second radio frequency chains to produce narrower side-band emissions than the first radio frequency chains.

The configuring may comprise configuring the first radio frequency chains to produce transmissions with greater power within the central band than within the at least one side band.

The configuring may comprise configuring the second radio frequency chains to produce transmissions with greater power within the at least one side band than within the central band.

The first radio frequency chains may be less linear than the second radio frequency chains.

The second radio frequency chains may be more linear than the first radio frequency chains.

The central band may comprise at least a first group of central sub-carriers within the channel.

The side band may comprise a second group of sub-carriers adjacent the first group within the channel.

The configuring may comprise configuring the second plurality of second radio frequency chains to cause transmissions predominantly within a pair of side bands within the channel.

The second group of sub-carriers may surround the first group of central sub-carriers within the channel.

The first group of sub-carriers may comprise different sub-carriers from the second group of sub-carriers.

Each of the first plurality of first radio frequency chains may comprise a non-linear precoder.

Each of the first plurality of first radio frequency chains may share the non-linear precoder.

The configuring may comprise configuring the non-linear precoder to cause transmissions outside the channel with a power which is less than a second threshold amount.

The configuring may comprise configuring the non-linear precoder to cause transmissions within the side bands with a power which is less than a first threshold amount.

The first threshold amount may be greater than the second threshold amount.

The configuring may comprise configuring the non-linear precoder to beamform transmissions within the central band towards an intended recipient.

The configuring may comprise configuring the non-linear precoder to beamform transmissions within the side bands away from an intended recipient.

The configuring may comprise the non-linear precoder to reduce power of transmissions within the side bands compared to transmissions within the central band.

Each of the second plurality of second radio frequency chains may comprise a linear precoder.

Each of the second plurality of second radio frequency chains may share the linear precoder.

The configuring may comprise configuring the linear precoder to cause transmissions within the central band with a power which is less than a third threshold amount.

The configuring may comprise configuring the linear precoder to cause transmissions outside the channel with a power which is less than the second threshold amount.

The configuring may comprise configuring the linear precoder to beamform transmissions within the side bands towards an intended recipient.

The configuring may comprise configuring the linear precoder to beamform transmissions within the central band away from an intended recipient.

The configuring may comprise configuring the linear precoder to reduce power of transmissions within the central band compared to transmissions within the side bands.

The intended recipient may comprise a user equipment.

The providing may comprise providing a pair of antenna arrays, a first of the pair comprising the first plurality of the antenna elements and a second of the pair comprising the second plurality of the antenna elements.

According to various, but not necessarily all, embodiments of the invention there is provided a computer program comprising instructions for causing the apparatus to perform at least the following: configure first radio frequency chains to produce wider side-band emissions than second radio frequency chains, configure the first plurality of first radio frequency chains to cause transmissions predominately in a first band within a channel and configure the second plurality of second radio frequency chains to cause transmissions predominately in at least one second band within the channel.

The computer program may comprise the features mentioned above.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

DETAILED DESCRIPTION

Before discussing the example embodiments in any more detail, first an overview will be provided. Some embodiments provide an arrangement which utilises different performance properties of transmission chains. In particular, two different sets of transmission chains are utilised to supply signals to associated antenna elements. One of the sets of transmission chains is less linear than the other set and so their transmissions tend to be wider or spread out, occupying more bandwidth due to wider roll off transmissions outside of the intended subchannels. However, these transmissions tend to be more power efficient than the other set. The other set of transmissions are more linear and so their transmissions tend to be narrower, occupying less bandwidth due to narrower roll off transmissions outside of the intended subchannels. However, these transmissions tend to be less power efficient. When considering transmissions within an allocated bandwidth or spectral mask of a channel, the less linear transmission chains are configured to transmit within a first region of the channel, away from at least one guard band(s) at the edges of the channel. The roll off transmissions are then contained in side band(s) within the allocated bandwidth of the channel. The more linear transmission chains are configured to transmit within a second region on at least one side of the first region of the channel. The roll off transmissions from the more linear transmission chains are then also contained within the allocated bandwidth of the channel. This enables the more efficient non-linear transmissions to occur within the first region of the channel whilst still containing roll off transmissions within the allocated bandwidth of the channel, with less efficient transmission occurring in the second region. This provides for an efficient and cost effective arrangement. In some embodiments, the first region is at least a centre region of the channel and the second region is at least one side band of the channel. In the following description, non-linear is used to refer to arrangements where some transmission chains are less linear than other transmission chains. In particular, non-linear transmission chains are typically those whose side-band emissions are larger or wider than more linear transmission chains.

Figure 1:
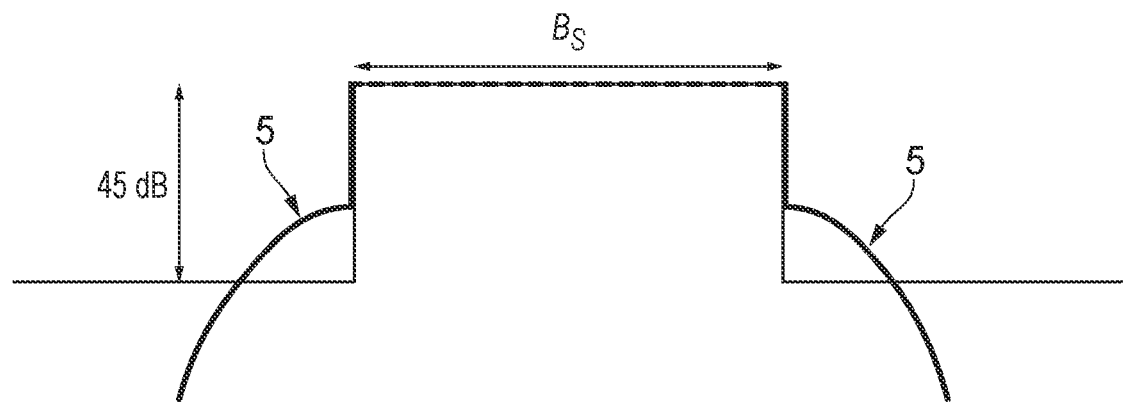
FIG. 1 illustrates an example of bandwidth expansion from using non-linear components in a radio frequency transmission chain.

As mentioned above, a challenge with non-linear hardware is the bandwidth expansion (roll off transmission) of signals at the output of the non-linear transmission chains and the corresponding out-of-band emissions at the antenna—where the radiated signal does not adhere, for example, and not limited to, to the 3GPP spectral mask requirements. For instance, with low-resolution digital to analogue converters (DACs), the strong quantization noise results in out-of-band (OOB) emissions and, in the case of constant-envelope precoding, the lack of amplitude modulation results in a signal that has a slow roll-off outside the signal bandwidth. The excess bandwidth results in a loss of spectral efficiency and also does not comply with 3GPP requirements, as illustrated in FIG. 1. which shows the roll off transmissions 5. In particular, if the non-linear hardware is used at full power over the entire channel, then due to the slow roll-off, the system does not comply with 3GPP requirements. Alternatively, if the non-linear hardware is only used at full power over a central band, then the slow roll off occurs in the guard bands, and the system does comply with 3GPP. But in that case there is a loss of spectral efficiency since data is not communicated in the guard bands.

The growth in wireless traffic necessitates the use of complex modulation schemes (high-order quadrature amplitude modulation and orthogonal frequency-division multiplexing) with high peak to average power ratio (PAPR) signals. Such signals impose stringent linearity requirements on the transmit chain design, yielding high power backoff factors and thus low energy efficiency performance. Furthermore, massive multiple-input multiple-output (MIMO) systems form the main cornerstone technology for the fifth generation (5G) of wireless communications systems. To enable the practical implementation of very large antenna arrays (i.e., going beyond 64 antennas), simple and cost-effective transmit chains with energy-efficient power amplifiers (PA) are needed.

Conventional radio frequency chains are linear, in that they are designed such that the signal radiated by the antenna is an amplified and frequency-shifted version of the signal at the baseband. Consequently, the cost of a conventional radio frequency chain is dominated by component costs for linear hardware such as high-resolution digital-to-analogue convertors (DACs) that faithfully construct the analogue signal, and linearizing hardware such as digital pre-distorters (DPDs) and feedback receivers that remove non-linearities.

In addition to an increased cost, linear/linearized power-amplifiers are operated in the less power-efficient linear region to preserve signal integrity and hence are the dominant source of power wastage in a radio frequency transmission chain.

One approach to reducing radio frequency transmission chain cost is to replace linear hardware by non-linear hardware or remove some or all of the linearizing components where the signals at the antenna are no longer faithfully reconstructed versions of the signals at the baseband. However, with a massive MIMO base station with several antennas, "dirty" signals from each transmit antenna can be combined "over the air" to create a clean signal at the user equipment. However, over-the-air signal combining with non-linear hardware is not straightforward and requires dedicated baseband algorithms that compensate for some of the effects of the non-linear hardware which are referred to as non-linear precoding.

Linear/Non-Linear Array

Figure 2A:
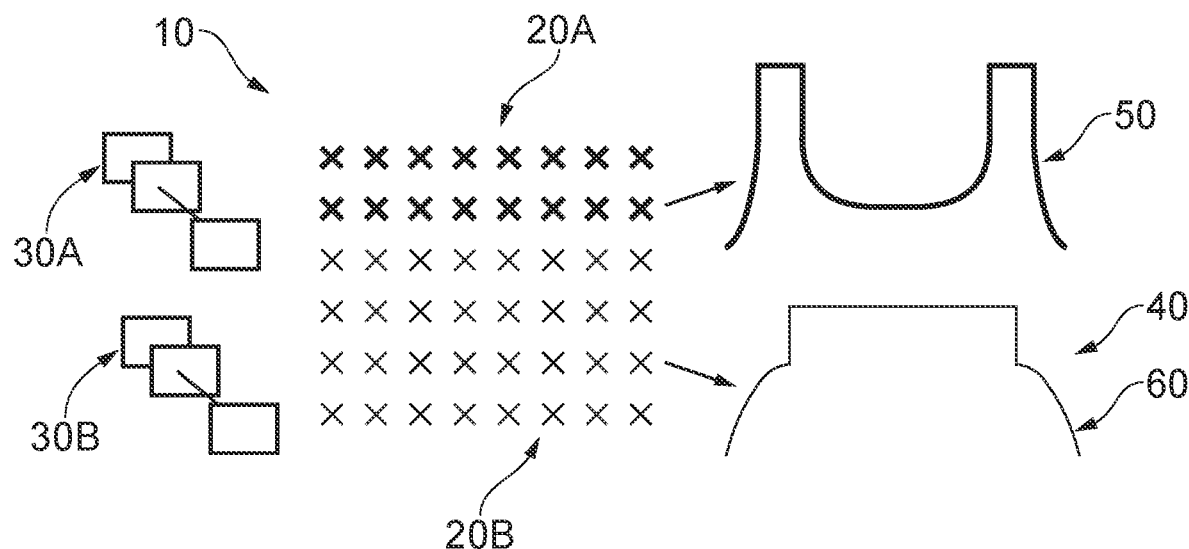
FIG. 2A illustrates schematically the arrangement and operation of an apparatus according to one embodiment

Some embodiments utilize mixed arrays, i.e., arrays that contain a mixture of linear and non-linear (or less linear and even less linear) radio frequency transmission chains, as illustrated schematically in FIG. 2A. As can be seen in FIG. 2A. an antenna array 10 for, for example, a base station comprises a plurality of antenna elements 20A and a plurality of antenna elements 20B, in this example arranged as a n×m array. Also provided are a plurality of linear radio frequency transmission chains 30A, each one of which is coupled with a corresponding antenna element 20A. Similarly, there is provided a plurality of non-linear radio frequency transmission chains 30B, each one of which is coupled with a corresponding antenna element 20B. Although this embodiment shows the antenna elements 20A; 20B collocated, this need not be the case and they may be located at different locations within a cell and coupled with the base station. Also, although this embodiment shows a separate linear radio frequency chain 30A for each antenna element 20A, a single linear radio frequency transmission chain 30A may be provided which is shared by all the antenna elements 20A. Likewise, although this embodiment shows a separate non-linear radio frequency transmission chain 30B for each antenna element 20B, a single non-linear radio frequency transmission chain 30B may be provided which is shared by all the antenna elements 20B.

Linear Transmission Chain

Figure 3:
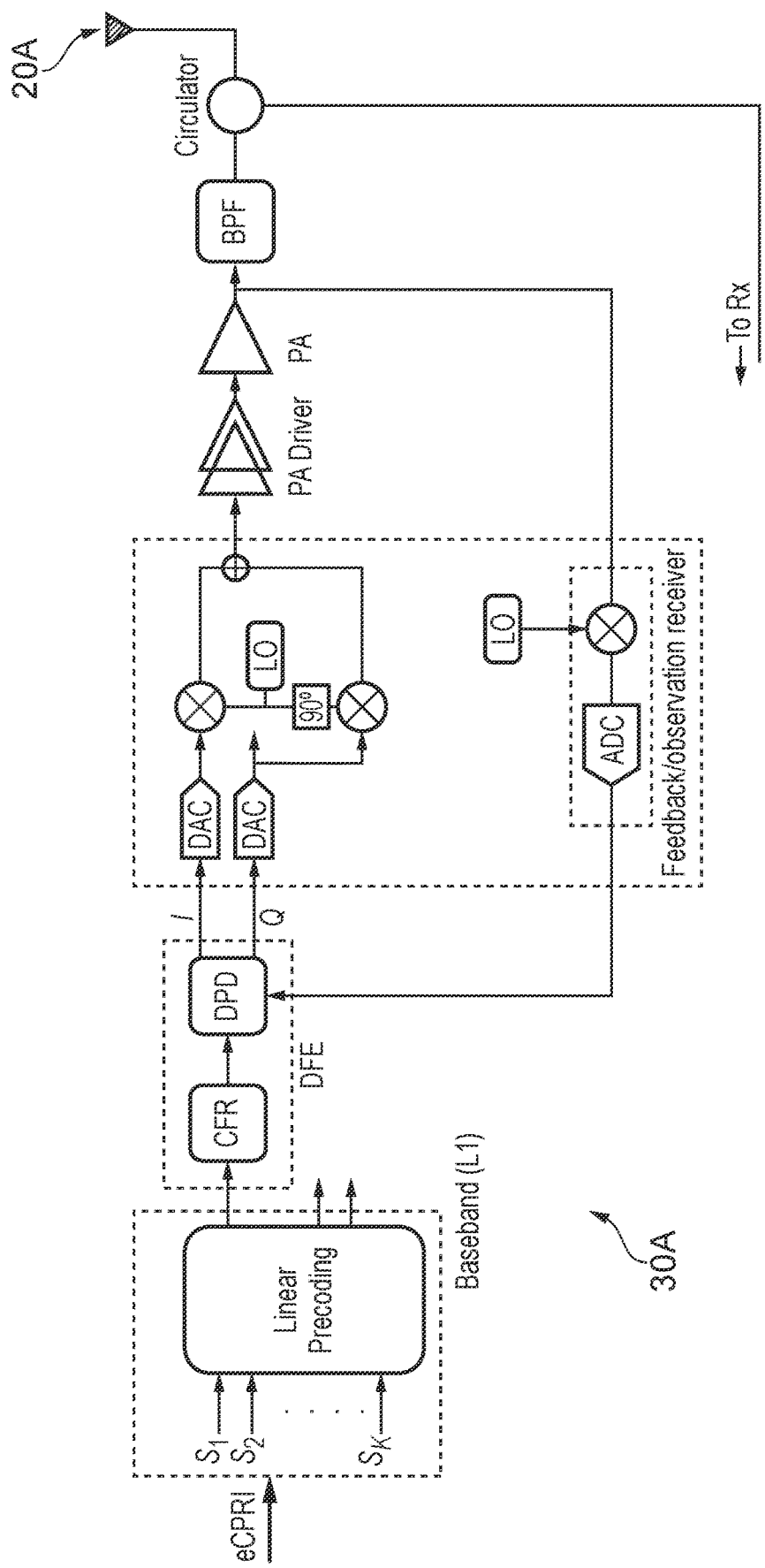
FIG. 3 is a block diagram showing a linear radio frequency transmission chain.

FIG. 3 illustrates schematically an example linear radio frequency transmission chain 30A coupled with an antenna element 20A, with a linear precoder, a digital pre-distorter (DPD), digital to analogue converters (DAC) and an analogue to digital convertor (ADC) providing the linear/linearizing components. In some embodiments, the linear precoder is shared by all antenna elements 20A. In other embodiments, a linear precoder is provided for each antenna element 20A. The other components comprise a Crest Factor Reduction (CFR) as part of the digital front end (DFE), a power amplifier (PA) driver power amplifier (PA) and a band pass filter (BPF) as is known in the art.

Non-Linear Transmission Chain

Figure 4:
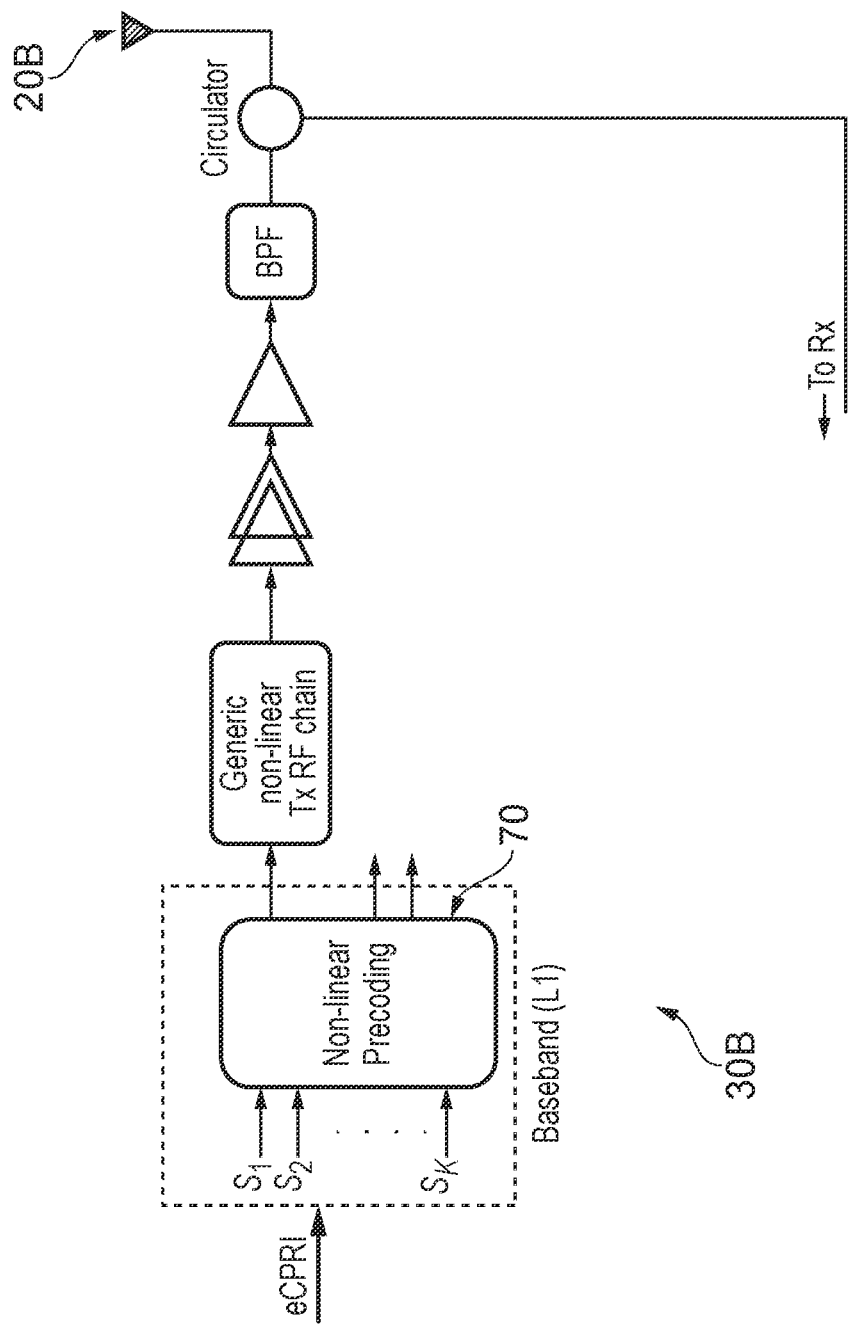
FIG. 4 is a block diagram showing a non-linear radio frequency transmission chain.

FIG. 4 illustrates schematically an example non-linear radio frequency transmission chain 30B with a non-linear precoder 70 as will be explained in more detail below. The non-linear radio frequency transmission chain 30B is coupled with an antenna element 20B.

Transmissions

Since the non-linear radio frequency transmission chains 30B generate excess OOB emissions compared with the linear radio frequency transmission chains 30A, their transmission bandwidth is chosen to be smaller than the overall signal or channel bandwidth $B_S$. In other words, the antenna elements 20B transmit signals that are in the centre part $B_{NL}$ of the overall signal or channel bandwidth $B_S$ such that the bandwidth expansion caused by the non-linear radio frequency transmission chains 30B happens within the overall signal or channel bandwidth $B_S$. Consequently, the OOB emissions from these non-linear radio frequency transmission chains 30B become in-band emissions, occurring within the guard or side bands $B_L/2$ and are indicated as signal portions 60.

Figure 2B:
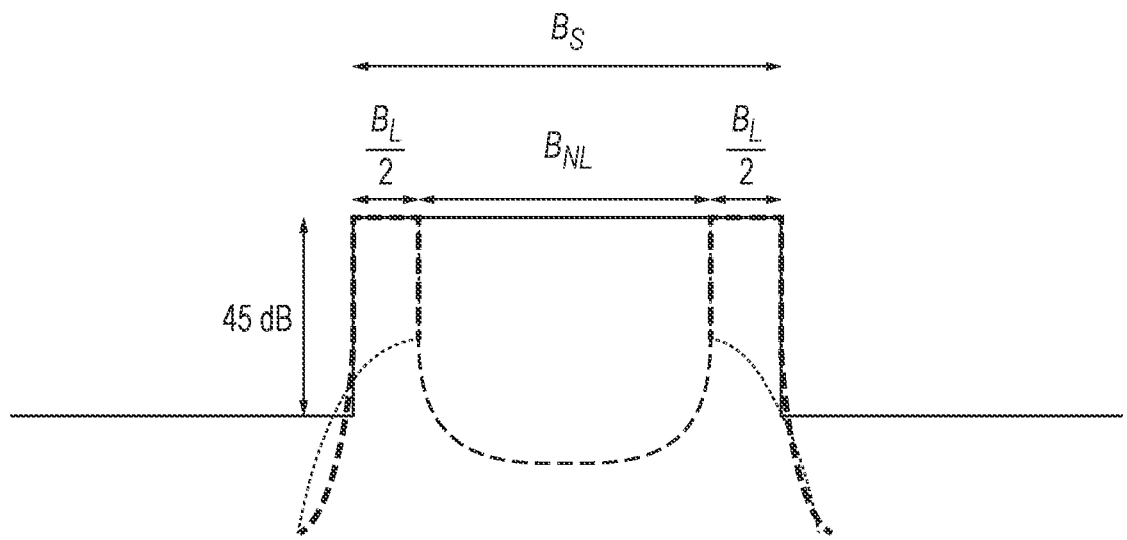
FIG. 2B illustrates transmissions of the apparatus according to one embodiment.

The antenna elements 20A radiate over the guard or side bands $B_L/2$ containing the in-band emissions of the antenna elements 20B. This is depicted in FIG. 2B where the band 40 with bandwidth $B_{NL}$ at the centre of the overall signal or channel bandwidth $B_S$ corresponds to the signal radiated by the antenna elements 20B from the non-linear radio frequency transmission chains 30B and the band 50 with bandwidth $B_L$ (on the roll-off band of band 40) corresponds to the signal radiated by the antenna elements 20A from the linear radio frequency transmission chains 30A. The combined signal then satisfies the 45 dB adjacent channel leakage ratio (ACLR) specified by 3GPP.

However, such an arrangement has a number of disadvantages such as the subcarriers radiated by the linear radio frequency transmission chains 30A have a smaller array gain than the ones radiated by the non-linear radio frequency transmission chains 30B. Consequently, the spectral efficiency of these subcarriers is smaller. Also, the overall spectral efficiency decreases monotonically with increasing side bands $B_L$. Furthermore, the inband emissions from the non-linear radio frequency transmission chains 30B will interfere with the subcarriers radiated by the linear radio frequency transmission chains 30A and increase the error vector magnitude in these subcarriers.

Figure 2C:
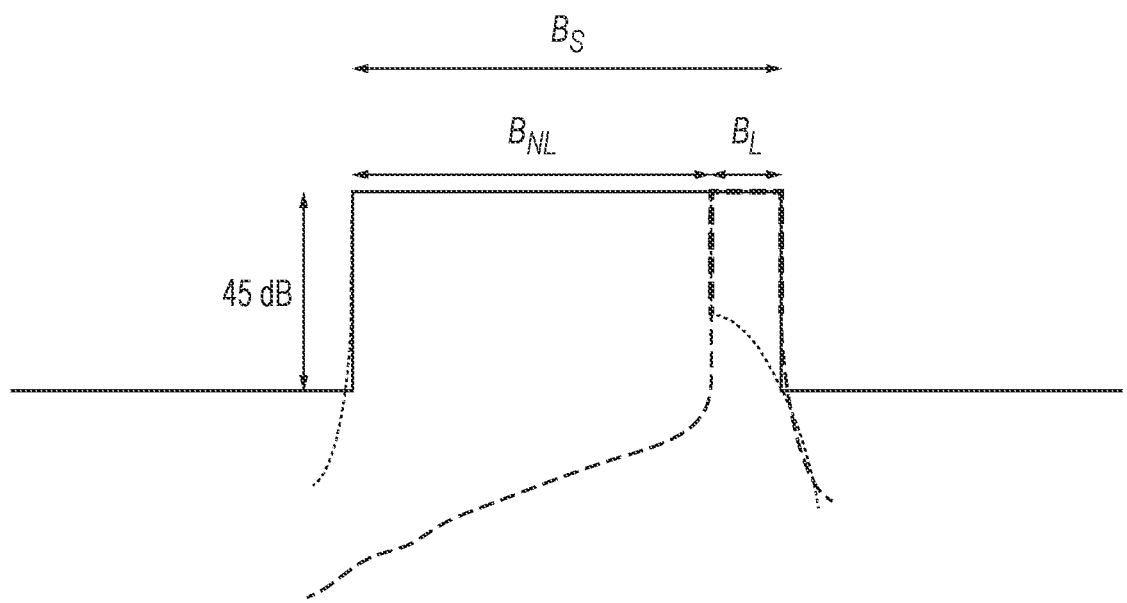
FIG. 2C illustrates transmissions of the apparatus according to one embodiment.

FIG. 2C illustrates an embodiment where the antenna elements 20A radiate over just one guard or side band $B_L$ containing the in-band emissions of the antenna elements 20B. This is depicted in FIG. 2C where the band with bandwidth $B_{NL}$ towards one side of the overall signal or channel bandwidth $B_S$ corresponds to the signal radiated by the antenna elements 20B from the non-linear radio frequency transmission chains 30B and the side band with bandwidth $B_L$ corresponds to the signal radiated by the antenna elements 20A from the linear radio frequency transmission chains 30A. The combined signal then satisfies the 45 dB adjacent channel leakage ratio (ACLR) specified by 3GPP.

Non-Linear Precoding

Some of these disadvantages can be addressed by using non-linear precoding within the non-linear precoder 70 to take advantage of the spatial degrees of freedom and radiate the distortion component of the "dirty" signals from each non-linear radio frequency chain 30B away from the user equipment (UEs) while ensuring the signal component in the beam direction of the UE to be "clean".

In essence, the approach of FIG. 2A is combined with a non-linear precoding algorithm within a non-linear precoder that helps to ensure that the out of band (in this example, the side band) emissions from the non-linear radio frequency transmission chains 30B are optionally beamformed away from the beam directions corresponding to the UEs whereas the subcarriers radiated by the linear radio frequency transmission chains 30A in this band are beamformed in the beam direction. Alternatively or additionally, the non-linear precoding algorithm helps to ensure that power of the out of band (in this example, the side band) emissions from the non-linear radio frequency transmission chains 30B is reduced compared to the subcarriers radiated by the linear radio frequency transmission chains 30A in this band. Consequently, there is reduced interference between the emissions and the subcarriers in $B_L$ thereby preventing an EVM increase in these subcarriers. Also, the non-linear precoder helps to ensure a decrease in the bandwidth of the in-band emissions so that a larger fraction of the system bandwidth $B_S$ is supported by the non-linear radio frequency transmission chains 30B. This results in an overall higher spectral efficiency since the fraction of subcarriers that have a higher array gain and diversity increases.

For arrangements that provide a large number of linear radio frequency transmission chains 30B which make use of the entire channel bandwidth $B_S$, this approach allows for a majority of those linear radio frequency transmission chains 30A to be replaced with low-cost, simpler non-linear radio frequency transmission chains 30B while still meeting the 3GPP spectral masks.

The linear radio frequency transmission chains 30A and the non-linear radio frequency transmission chains 30B radiate on different subcarriers (or over non-overlapping bandwidths) to address the problem of out-of-band emissions (the OOB emissions from the non-linear radio frequency transmission chains 30B are converted into inband emissions) while lowering the overall cost and complexity of the base station containing this equipment. The non-linear precoding algorithm limits the in-band emissions and optionally radiates them in spatial directions away from the UE beam so that the in-band emissions from the non-linear radio frequency transmission chains 30B do not increase the EVM of the subcarriers in the bandwidth $B_L$. Hence, this approach utilizes a mixed-array architecture to address the OOB emissions problem that is inherent in non-linear radio frequency transmission chains 30B. The combination of this approach is a base station architecture that offers a higher spectral efficiency per dollar/euro, when compared to conventional linear approaches, while meeting the 3GPP spectral masks.

In summary, this approach splits the array to into two parts that radiate on different subcarriers to ameliorate the problem of out-of-band emissions while lowering overall cost of the base station. The algorithm for non-linear precoding generates constant-envelope or almost constant-envelope signals in all non-linear radio frequency transmission chains 30B so that they combine, for example, to the desired Orthogonal Frequency Division Multiplexing (OFDM) signal or other type of signal over-the-air at the UEs. Optionally, the non-linear precoding algorithm also ensures that the in-band emissions are radiated away from the UE beam direction so that the EVM in the bandwidth $B_L$ does not increase.

Non-Linear Precoding Algorithm

We consider an OFDM system with N subcarriers, divided into subcarrier sets $N_u$ (used by the non-linear chains to carry data), $\mathcal{N}$ (empty, not used for data by the non-linear chains). Via oversampling by a factor of $\theta$, our processing effectively works with a total of $N\theta$ subcarriers. The additional $N(\theta-1)/2$ subcarriers on either side of the central N subcarriers are denoted by $\mathcal{N}_o$. (out-of-band subcarriers). Given a subcarrier spacing of $f_s$, the total system bandwidth is $B_S = f_s N$, the bandwidth covered by the non-linear RF chains is $B_{NL} = f_s |\mathcal{N}_u|$ and the bandwidth covered by the linear RF chains is $B_L = f_s |\mathcal{N}_e|$.

Some of the constraints to be enforced will be defined over groups of subcarriers—for example groups of 20 adjacent subcarriers. The set of subcarriers in group g will be denoted G(g), and the sets of subcarrier groups that make up the subcarrier sets $\mathcal{N}_u$, $\mathcal{N}_e$, and $\mathcal{N}_o$ will be denoted $\mathcal{G}_u$, $\mathcal{G}_e$, and $\mathcal{G}_o$ respectively. That is, for example, $\mathcal{N}_u = \cup_{g \in \mathcal{G}_u} G(g)$.

The non-linear portion of the array has M radio frequency chains, and we are communicating to K user equipment (UE) devices simultaneously. We describe the baseband processing that determines the complex time domain signals to be sent on each RF chain during one OFDM symbol.

We define the following notation:

H[n]: for each subcarrier n, a K×M downlink matrix from M antennas to K UEs.

u[n]: K×1 vector, modulated constellation data to send on subcarrier n.

x[n]: M×1 vector, freq. domain signal to send on M antennas on (extended) subcarrier n.

X=[x[1], ..., x[n]]: Mx(N$\theta$) matrix, extended frequency domain precoded signal.

A=XF: Mx(N$\theta$) oversampled time domain signal, where F is the (N$\theta$)×(N$\theta$) IFFT matrix, normalized to be Hermitian such that $F^H F = FF^H = I$.

The non-linear precoding block is given estimates of the channel H[n] and constellation data, for each $n \in \mathcal{N}$. The output of the block is the matrix A, giving the complex time-domain values to be modulated on the M non-linear RF chains over the N$\theta$ time samples of the oversampled OFDM symbol.

The oversampling factor $\theta$ determines the additional bandwidth, on either side of the system bandwidth, that is "monitored" by the non-linear processing, to ensure that out-of-band signal energy is kept below stringent requirements. Frequencies beyond this bandwidth should be controlled by the final band-pass filter (BPF) depicted in FIGS. 3 and 4.

Figure 5:
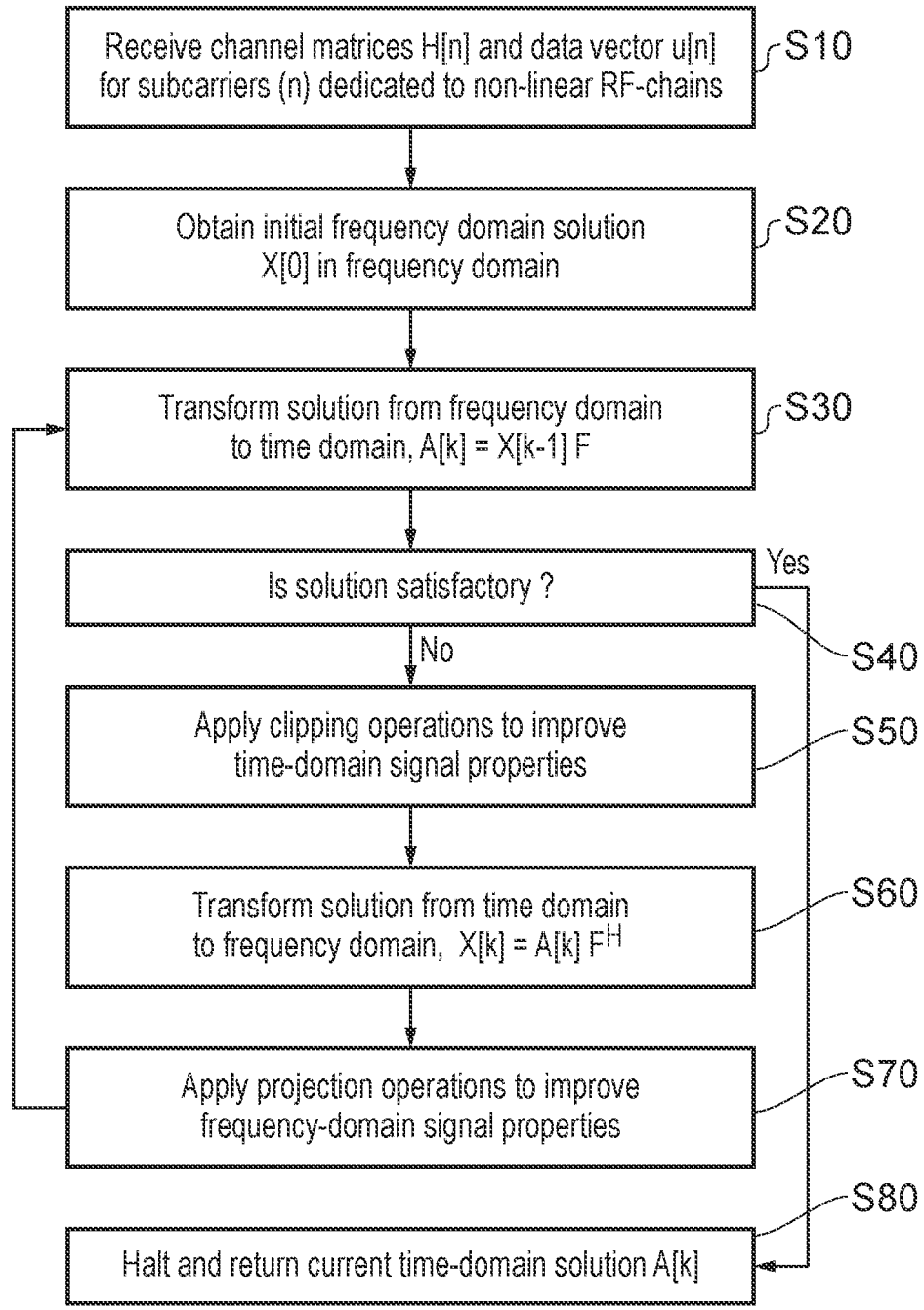
FIG. 5 is a flow chart illustrating a non-linear precoding method.

A general procedure for non-linear precoding is indicated in FIG. 5.

At block S10, the initial data provided are the channel matrices H[n] and the user data vectors u[n], for the set of subcarriers $n \in \mathcal{N}$.

At block S20, linear precoding methods, known in the art are used to obtain a frequency domain signal X[0] that is appropriate for communicating the data over these channels, but which may not have desirable time-domain properties.

At block S30, the inverse Fourier transform is used to convert the signal to the time domain.

At block S40, if the time-domain properties of the signal are satisfactory, the algorithm ends and returns the current time-domain solution.

Otherwise, at block S50 clipping operations, or non-linear operations similar to clipping, are applied to improve the time domain signal properties.

At block S60, the Fourier transform is used to convert the signal to the frequency domain.

At block S70, operations such as projection or approximate projection are used to improve the frequency-domain properties of the signal, for example ensuring that out-of-band signal energy is sufficiently low.

The procedure is then repeated from the inverse Fourier transform block S30, until a satisfactory solution is found, or until a maximum number of iterations is reached.

Although multiple solutions are possible, two embodiments of this non-linear precoding procedure will now be described. In the first, the goal is to minimize the maximum amplitude of the time-domain signal. In the second, the goal is to minimize the maximum amplitude of the time-domain signal, subject to a constraint on the max-min ratio of the signal envelope. In both cases, the characteristics of the amplitude of the precoded time-domain signal makes the signal suitable for reduced cost or higher efficiency RF chain hardware, as described previously.

Algorithm 1: Minimize the maximum signal amplitude, subject to spectral constraints
The objective and constraints motivating Algorithm 1 are:

$$\min_A \max_{m,t} |A_{mt}| \text{ s.t.}$$

$$\sum_{n \in G(g)} |u_k[n] - H_k[n]x[n]|^2 \leq |G(g)|\varepsilon_u \forall g \in \mathcal{G}_u, \forall k$$

$$\sum_{n \in G(g)} |x_m[n]|^2 \leq |G(g)|\varepsilon_e \forall g \in \mathcal{G}_e, \forall m$$

$$\sum_{n \in G(g)} |x_m[n]|^2 \leq |G(g)|\varepsilon_o \forall g \in \mathcal{G}_o, \forall m$$

$$X = AF$$

In other words, the goal is to minimize the peak amplitude of the time domain signal A, subject to frequency domain constraints. For used tone groups $\mathcal{G}$, the signal $H_k[n] \times [n]$ received by the k-th UE should be close to the desired data constellation value $u_k[n]$. For empty tone groups $\mathcal{G}_e$ and out-of-band tone groups $\mathcal{G}_o$, the average transmitted energy over the tone group should not exceed $\varepsilon_e$ and $\varepsilon_o$, respectively. Here, the out-of-band energy requirement is very small, in order to enforce regulator constraints on the ACLR.

To solve the specified convex optimization problem, Algorithm 1 applies Douglas-Rachford iteration, as follows.

Input: Given $H[n]$, $u[n]$, for each $n \in G(g)$ for each $g \in \mathcal{G}_u$.

Initialization: Set $x[n] = H[n]^H (H[n]H[n]^H)^{-1} u[n]$ for each $n \in G(g)$ for each $g \in \mathcal{G}_u$, and set $x[n]=0$ for all other subcarriers. Then form $X=[x[1], x[2], \ldots x[N\theta]]$ and $A[0]=XF$ i.e., $A[0]$ is the inverse fourier transform of the linear zero-forcing solution.

Iteration: Repeat following iterative steps, starting from $k=0$:

1) $B[k] = \text{prox}_{f2}(A[k])$; (i.e. do projection in frequency domain to satisfy constraints)
2) Choose proximal scale factor $\gamma[k]$ (see later for explanation)
3) $C[k] = \text{prox}_{\gamma[k]f1}(2B[k]-A[k])$; (i.e. apply clipping with impact parameter $\gamma[k]$)
4) $A[k+1] = A[k] - B[k] + C[k]$ After some iterations, output $B[k]$, a valid solution which satisfies frequency domain constraints.

Note that $A[k]$, $B[k]$, and $C[k]$ are $M \times (N\theta)$ matrices of complex values.

To define the function $\text{prox}_{\gamma[k]f1}$ mentioned in step 3), we first define the clipping function $$h(a, c) = a \min\left\{1, \frac{c}{|a|}\right\}$$

for complex $a$ and non-negative $c$. Then $B = \text{prox}_{\gamma f1}(A)$ means to apply the clipping function to each element of $A$, i.e. $B_{mt} = h(A_{mt}, c^*)$, where the clipping threshold $c^*$ is chosen to satisfy $\sum_{m,t}|A_{mt} - h(A_{mt}, c^*)| = \gamma$.

The operator $B = \text{prox}_{f2}(A)$ mentioned in step 1 enforces the frequency-domain constraints. It is defined as follows.

Given input matrix $A$

Calculate Fourier transform $X = AF^H$

For each antenna $m$ and each $g \in \mathcal{G}$, define $\tau_{g,m} = \mathcal{G}(g)^{-1} \sum_{n \in G(g)} |x_m[n]|^2$. Then set $$y_m[n] = x_m[n] \min\left\{1, \frac{\varepsilon_e}{\tau_{g,m}}\right\}$$

(enforcing energy constraint for empty tone groups)

For each antenna $m$ and each $g \in \mathcal{G}_o$, define $\tau_{g,m} = |\mathcal{G}(g)|^{-1} \sum_{n \in G(g)} |x_m[n]|^2$. Then set $$y_m[n] = x_m[n] \min\left\{1, \frac{\varepsilon_0}{\tau_{g,m}}\right\}$$

(enforcing energy constraint for out-of-band tone groups)

For each user $k$ and each $g \in \mathcal{G}_u$, define $s_{g,k} = |\mathcal{G}(g)|^{-1} \sum_{n \in \mathcal{G}(g)} |u_k[n] - H_k[n]x[n]|^2$. Then $$\lambda_g = \min\left\{1, \frac{\varepsilon_e}{\max_k s_{g,k}}\right\},$$

$H[n]^+ = H[n]^H (H[n]H[n]^H)^{-1}$, $z[n] = H[n]^+ u[n]$, and then for each antenna $m$ set $y_m[n] = x_m[n] - (1-\lambda_g) H[n]^+ H[n](x_m[n] - z_m[n])$ (enforcing sufficiently small received error).

Finally, calculate inverse Fourier transform $B = YF$.

Choice of the scale factor $\gamma[k]$: In step 2, we choose a scale factor that is applied in step 3. Different methods can be employed, and may affect the convergence speed of the algorithm. One possibility is to use a fixed step size. A method that seems to lead to fast convergence is $$\gamma[k] = \frac{1}{2} \sum_{m,t} |A_{mt}[k] - B_{mt}[k]|.$$

---

Algorithm 2: Minimize the maximum signal amplitude, subject to spectral constraints and envelope ratio constraints.
The objective of this algorithm can be specified as follows:
The objective and constraints motivating Algorithm 1 are:

$$\min_A \max_{m,t} |A_{mt}| \text{ s.t.}$$

$$\sum_{n \in G(g)} |u_k[n] - H_k[n]x[n]|^2 \leq |G(g)|\varepsilon_u \, \forall \, g \in \mathcal{G}_u, \, \forall \, k$$

$$\sum_{n \in G(g)} |x_m[n]|^2 \leq |G(g)|\varepsilon_e \, \forall \, g \in \mathcal{G}_e, \, \forall \, m$$

$$\sum_{n \in G(g)} |x_m[n]|^2 \leq |G(g)|\varepsilon_o \, \forall \, g \in \mathcal{G}_0, \, \forall \, m$$

$$\beta \min_{m,t} |A_{mt}| \geq \max_{m,t} |A_{mt}|$$

$$X = AF$$

---

The only difference between this problem and the problem solved by Algorithm 1 is the requirement that the ratio of maximum to minimum amplitude does not exceed a specified ratio $\beta$. This requirement makes the problem non-convex. However, a modification of Algorithm 1 seems able to find reasonable solutions in practice. By taking $\beta=1$, the algorithm looks for constant envelope signals, suitable for a RF-chain with phase modulation only. Taking $\beta>1$ produces signals with a limited dynamic range envelope.

The algorithm is as follows.

Input: Given $H[n]$, $u[n]$, for each $n \in G(g)$ for each $g \in \mathcal{G}_u$.

Initialization: Set $x[n] = H[n]^H(H[n]H[n]^H)^{-1}u[n]$ for each $n \in G(g)$ for each $g \in \mathcal{G}_u$, and set $x[n]=0$ for all other subcarriers. Then form $X=[x[1], x[2], \ldots x[N\theta]]$ and $A[0]=XF$ i.e., $A[0]$ is the inverse Fourier transform of the linear zero-forcing solution.

Iteration: Repeat following iterative steps, starting from $k=0$:

1) $B[k] = \text{prox}_{f2}(A[k])$; (i.e. do projection in frequency domain to satisfy constraints)
2)

Let $\hat{B} = \max_{m,t} |B_{mt}[k]|$, $\check{B} = \min_{m,t} |B_{mt}[k]|$, set minimum threshold $\tau = \min\left\{\frac{1}{2}(\hat{B}+\check{B}), \frac{\hat{B}}{\beta}\right\}$, 3) Choose proximal scale factor $\gamma[k]$ (as for Algorithm 1).
4) Let $Z[k] = 2B[k] - A[k]$, and clip below as $$Z'_{mt}[k] = Z_{mt}[k] \max\left\{1, \frac{\tau}{|Z_{mt}[k]|}\right\}.$$

5) $C[k] = \text{prox}_{\gamma[k]f_1}(Z'[k])$; (i.e. apply clipping above with impact parameter $\gamma[k]$)
6) $A[k+1] = A[k] - B[k] + C[k]$
7) Check for feasible solution:

$$\hat{A} = \max_{m,t}|A_{mt}[k+1]| \check{A} = \min_{m,t}|A_{mt}[k]|,$$

set threshold $\tau = \sqrt{\hat{A}\check{A}\beta}$. Clip above and below $$A'_{mt}[k+1] = A_{mt}[k+1]\min\left\{\max\left\{1, \frac{\frac{\tau}{\beta}}{|A_{mt}[k]|}\right\}, \frac{\tau}{|A_{mt}[k+1]|}\right\}.$$

Check if
  $X' = A'F$ satisfied the spectral constraints specified by $\varepsilon_u$, $\varepsilon_e$, and $\varepsilon_o$. If so, exit with solution $A'$.
8) Otherwise, ignore $A'[k+i]$ and continue from step 1 using $A[k+i]$ This procedure continues until a maximum number of iterations is reached without finding a feasible solution, or until existing step 7 with a feasible solution $A'$.

Results

Figure 6:
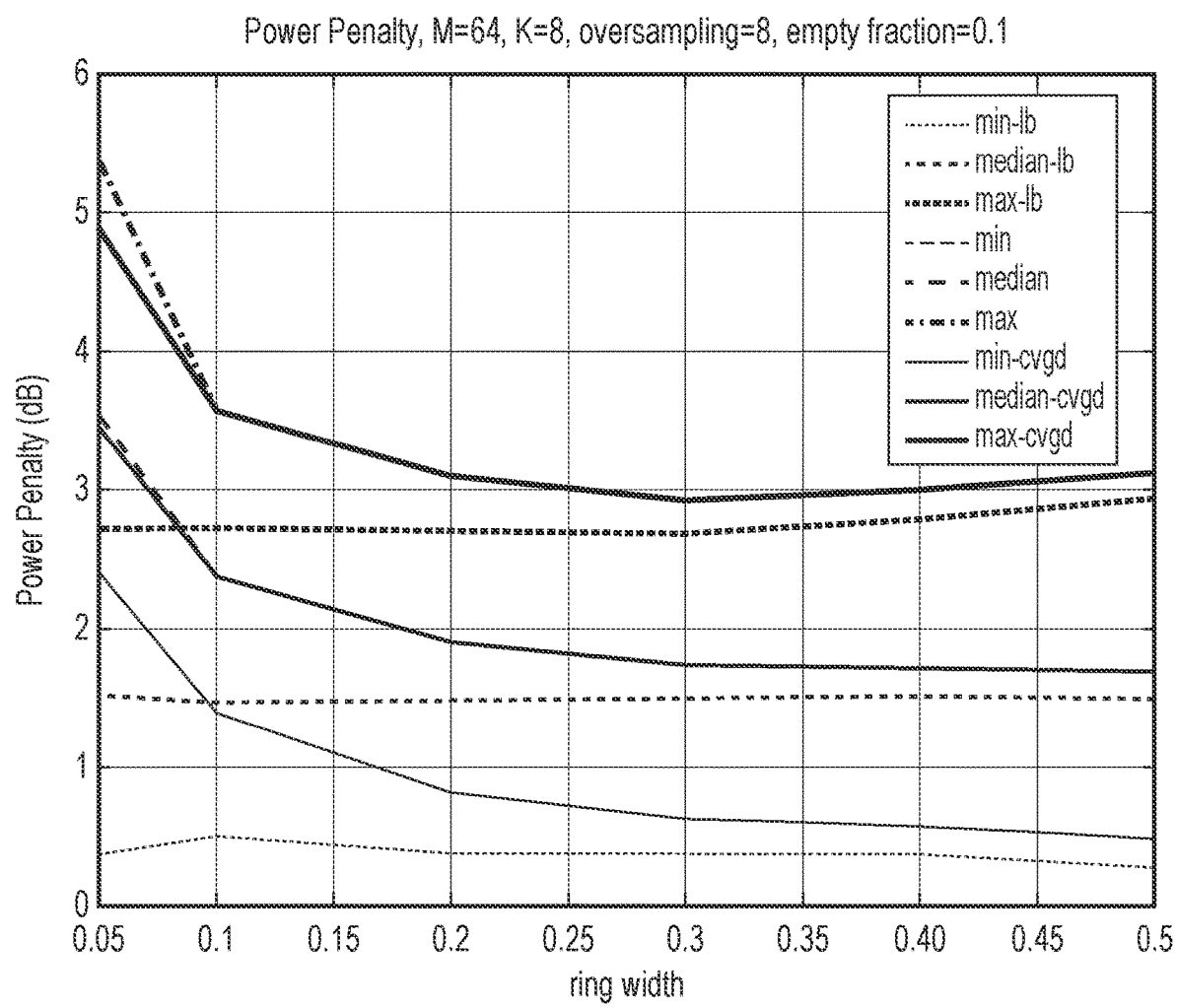
FIG. 6 illustrates a power penalty versus ring width using Algorithm 2, averaged over 100 instances.
Figure 7:
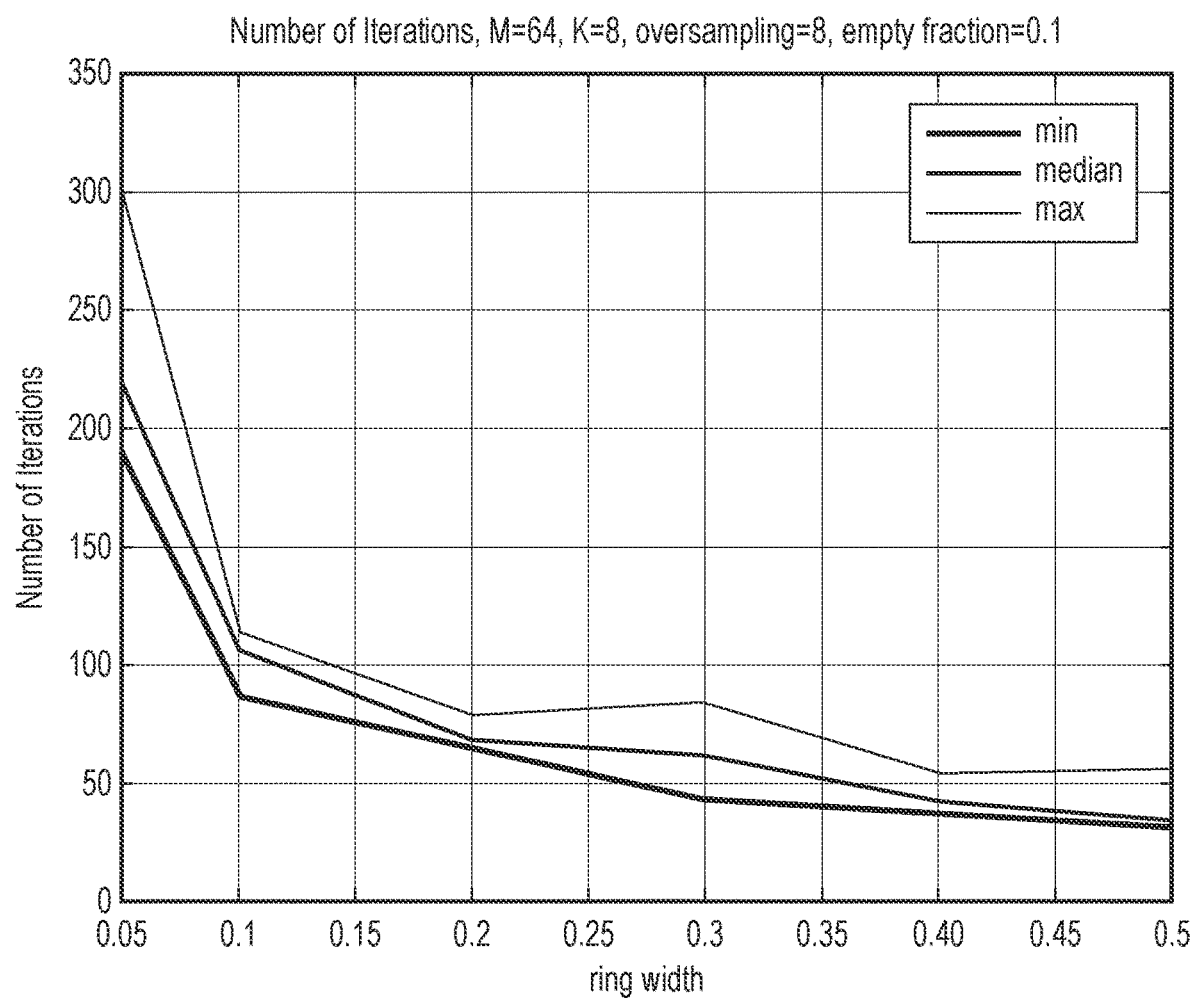
FIG. 7 illustrates a number of iterations versus ring width using Algorithm 2, averaged over too instances.

FIGS. 6 and 7 show numerical results obtained in a scenario with M=64 RF chains, K=8 UEs, oversampling factor of $\theta=8$, and with fraction of empty tones $$\frac{|\mathcal{N}_e|}{N} = 0.1 = B_L/B_S.$$

Algorithm 2 was applied to 100 instances of channel and user data, with different envelope ratio constraints $\beta$, and the power penalty of each instance was calculated. The power penalty is the ratio of the average transmit power of the non-linearly precoded signal A, compared with the linearly precoded signal $A[0]$. This power penalty is plotted as a function of ring width $$w = \frac{\beta - 1}{\beta + 1}$$

between 0.05 and 0.5, which is to say for $$\beta = \frac{1+w}{1-w}$$

ranging from 1.1 to 3. The number of iterations of Algorithm 2 required to obtain a feasible solution is depicted in FIG. 7. A larger ring width w helps the algorithm to converge faster, while making the hardware more challenging to implement. Varying parameters such as the empty fraction and the ring width, one can seek to optimize performance and efficiency tradeoffs in the mixed array design.

As an additional embodiment, we consider the configuration where linear radio frequency transmission chains 30A operate on the full signal bandwidth, and thus utilize the same subcarriers as the non-linear radio frequency transmission chains 30B. The radio frequency transmission chains 30A may contribute to data traffic (i.e., PDCCH and PDSCH) along with the non-linear linear radio frequency transmission chains 30B, since linear radio frequency transmission chains 30A can mimic the signals generated by non-linear linear radio frequency transmission chains 30B. In this embodiment, the non-linear precoder 70 treats the linear radio frequency transmission chains 30A as extra non-linear radio frequency transmission chains 30B and jointly precodes over both of them.

Further, the linear radio frequency transmission chains 30A may also be used for transmitting synchronization and broadcast channels, as needed for initial access and basic network operation. These signals and channels must be transmitted with broader beams to ensure good cell coverage, and thus cannot leverage the array gain from arrays with many antennas. In this embodiment, the non-linear precoder 70 ensures that the signals transmitted by the non-linear radio frequency transmission chains 30B do not interfere with signals from the linear radio frequency transmission chains 30A. It will be appreciated that the non-linear radio frequency transmission chains 30B can be implemented using a linear precoder which is paired with a digital predistortion module (in the non-linear Tx RF chain) which has a lower complexity than the digital predistortion module of the linear radio frequency transmission chains 30A to provide lower complexity digital predistortion than the linear radio frequency transmission chains 30A

In addition, as mentioned above, it is important to note that both arrays (i.e., the linear and the nonlinear ones), do not necessarily have to be co-located; that is, the linear array may be mounted on a cell tower, while the non-linear array (used as a data booster) can be deployed at some other location inside the same cell. This setup is particularly reasonable for situations where the cell tower is already overcrowded.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions performed some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:
a first plurality of first radio frequency chains;
a second plurality of second radio frequency chains, said first radio frequency chains being configured to produce wider side-band emissions than said second radio frequency chains; and
at least one antenna array comprising antenna elements, each of a first plurality of said antenna elements being coupled with a corresponding one of said first plurality of first radio frequency chains, said first plurality of first radio frequency chains being configured to cause transmissions predominately in a first band within a channel, and
each of a second plurality of said antenna elements being coupled with a corresponding one of said second plurality of second radio frequency chains, said second plurality of second radio frequency chains being configured to cause transmissions predominately in at least one second band within said channel.

2. The apparatus of claim 1, wherein said first band comprises at least a central band within said channel and said second band comprises a side band within said channel.

3. The apparatus of claim 1, wherein said first plurality of first radio frequency chains comprise a first digital predistortion module and said second plurality of second radio frequency chains comprise a second digital predistortion module, said second digital predistortion module being configured to perform higher complexity digital predistortion than said first digital predistortion module.

4. The apparatus of claim 2, wherein said central band comprises at least a first group of central sub-carriers within said channel and said side band comprises a second group of sub-carriers adjacent said first group within said channel.

5. The apparatus of claim 4, wherein said second plurality of second radio frequency chains are configured to cause transmissions predominantly within a pair of side bands within said channel and wherein said second group of sub-carriers surround said first group of central sub-carriers within said channel.

6. The apparatus of claim 4, wherein said first group of sub-carriers comprise different sub-carriers from said second group of sub-carriers.

7. The apparatus of claim 1, wherein each of said first plurality of first radio frequency chains comprise a non-linear precoder, wherein said non-linear precoders are configured to cause transmissions outside said channel with a power which is less than a second threshold amount and wherein said non-linear precoders are configured to cause transmissions within said side bands with a power which is less than a first threshold amount.

8. The apparatus of claim 7, wherein said first threshold amount is greater than said second threshold amount.

9. The apparatus of claim 7, wherein said non-linear precoders are configured to beamform transmissions within said central band towards an intended recipient and wherein said non-linear precoders are configured to beamform transmissions within said side bands away from an intended recipient.

10. The apparatus of claim 7, wherein each of said second plurality of second radio frequency chains comprise a linear precoder, wherein said linear precoders are configured to cause transmissions within a central band within the channel with a power which is less than a third threshold amount and wherein said linear precoders are configured to cause transmissions outside said channel with a power which is less than said second threshold amount.

11. The apparatus of claim 10, wherein said linear precoders are configured to beamform transmissions within side bands within the channel towards an intended recipient.

12. The apparatus of claim 1, wherein the at least one antenna array comprises a pair of antenna arrays, a first of said pair comprising said first plurality of said antenna elements and a second of said pair comprising said second plurality of said antenna elements.

13. A base station comprising the apparatus of claim 1.

14. A method, comprising:
providing a first plurality of first radio frequency chains, a second plurality of second radio frequency chains and at least one antenna array comprising antenna elements;
coupling each of a first plurality of said antenna elements with a corresponding one of said first plurality of first radio frequency chains and each of a second plurality of said antenna elements with a corresponding one of said second plurality of second radio frequency chains; and
configuring said first radio frequency chains to produce wider side-band emissions than said second radio frequency chains, said first plurality of first radio frequency chains to cause transmissions predominately in a first band within a channel and said second plurality of second radio frequency chains to cause transmissions predominately in at least one second band within said channel.

15. The method of claim 14, wherein said first band comprises at least a central band within said channel and said second band comprises a side band within said channel.

16. The method of claim 14, wherein said first plurality of first radio frequency chains comprise a first digital predistortion module and said second plurality of second radio frequency chains comprise a second digital predistortion module, and wherein the method further comprises configuring said second digital predistortion module to perform higher complexity digital predistortion than said first digital predistortion module.

17. The method of claim 15, wherein said central band comprises at least a first group of central sub-carriers within said channel and said side band comprises a second group of sub-carriers adjacent said first group within said channel.

18. The method of claim 17, further comprising configuring said second plurality of second radio frequency chains to cause transmissions predominantly within a pair of side bands within said channel, wherein said second group of sub-carriers surround said first group of central sub-carriers within said channel.

19. The method of claim 17, wherein said first group of sub-carriers comprise different sub-carriers from said second group of sub-carriers.

20. A computer program storage device encoded with computer-executable instructions for causing an apparatus to perform at least the following:
configure first radio frequency chains to produce wider side-band emissions than second radio frequency chains, configure a first plurality of first radio frequency chains to cause transmissions predominately in a first band within a channel and configure a second plurality of second radio frequency chains to cause transmissions predominately in at least one second band within said channel.

\* \* \* \* \*